US008647779B2

(12) United States Patent
Machida et al.

(10) Patent No.: US 8,647,779 B2
(45) Date of Patent: *Feb. 11, 2014

(54) NONAQUEOUS ELECTROLYTE COMPOSITION AND NONAQUEOUS ELECTROLYTE SECONDARY BATTERY

(71) Applicant: Sony Corporation, Tokyo (JP)

(72) Inventors: Masaki Machida, Fukushima (JP); Yosuke Kono, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/689,238

(22) Filed: Nov. 29, 2012

(65) Prior Publication Data

US 2013/0095378 A1   Apr. 18, 2013

Related U.S. Application Data

(63) Continuation of application No. 12/662,291, filed on Apr. 9, 2010, now Pat. No. 8,383,273.

(30) Foreign Application Priority Data

Apr. 27, 2009  (JP) .................................. 2009-108064

(51) Int. Cl.
*H01M 6/14* (2006.01)
*H01M 6/18* (2006.01)

(52) U.S. Cl.
USPC ............................ 429/300; 429/303; 429/320

(58) Field of Classification Search
USPC .................. 429/188, 300, 303, 320
See application file for complete search history.

(56) References Cited

U.S. PATENT DOCUMENTS

| | | | |
|---|---|---|---|
| 6,245,465 B1 * | 6/2001 | Angell et al. | 429/340 |
| 6,280,883 B1 | 8/2001 | Lamanna et al. | |
| 6,395,428 B1 | 5/2002 | Kezuka | |
| 2002/0006552 A1 | 1/2002 | Ishida et al. | |
| 2002/0018936 A1 | 2/2002 | Suzuki et al. | |
| 2006/0204856 A1 | 9/2006 | Ryu et al. | |
| 2007/0178384 A1 | 8/2007 | Kajita et al. | |

FOREIGN PATENT DOCUMENTS

| | | |
|---|---|---|
| CN | 102197066 A | 9/2011 |
| JP | 06-050885 | 2/1994 |
| JP | 06-140052 | 5/1994 |
| JP | 07-153495 | 6/1995 |
| JP | 09-022732 | 1/1997 |
| JP | 09-147916 | 6/1997 |
| JP | 09-306543 | 11/1997 |
| JP | 10-116513 | 5/1998 |
| JP | 10-214640 | 8/1998 |
| JP | 10-255842 | 9/1998 |
| JP | 2000-164254 | 6/2000 |
| JP | 2001-126766 | 5/2001 |
| JP | 2001-167794 | 6/2001 |
| JP | 2001-283917 | 10/2001 |
| JP | 2004-014373 | 1/2004 |
| JP | 2006-032359 | 2/2006 |
| JP | 2007-188777 | 7/2007 |
| JP | 2009-087889 | 4/2009 |

* cited by examiner

*Primary Examiner* — Carlos Barcena
(74) *Attorney, Agent, or Firm* — Rader, Fishman & Grauer PLLC

(57) ABSTRACT

A nonaqueous electrolyte composition includes: a nonaqueous solvent; an electrolyte salt; a matrix resin; a filler; and a surfactant.

2 Claims, 2 Drawing Sheets

NONAQUEOUS ELECTROLYTE COMPOSITION AND NONAQUEOUS ELECTROLYTE SECONDARY BATTERY

CROSS REFERENCES TO RELATED APPLICATIONS

This present application is a Continuation Application of patent application Ser. No. 12/662,291, filed Apr. 9, 2010, which claims priority from Japanese Patent Applications JP 2009-108064 filed in the Japanese Patent Office on Apr. 27, 2009, the entire contents of which being incorporated herein by reference.

BACKGROUND OF THE INVENTION

1. Field of the Invention

The present invention relates to a nonaqueous electrolyte composition and a nonaqueous electrolyte secondary battery.

In more detail, the present invention relates to a nonaqueous electrolyte composition containing a nonaqueous solvent, an electrolyte salt, a matrix resin, a filler and a surfactant and a nonaqueous electrolyte secondary battery using the same.

Also, in more detail, the present invention relates to a nonaqueous electrolyte composition containing a nonaqueous solvent, an electrolyte salt, a matrix resin and a filler containing a prescribed aluminum oxide and a nonaqueous electrolyte secondary battery using the same.

2. Description of the Related Art

In recent years, a number of portable electronic appliances have appeared, and it is contrived to achieve downsizing and weight reduction thereof.

Also, in batteries which are used as a power source of a portable electronic appliance, for the purpose of realizing downsizing and weight reduction of the portable electronic appliance, it is demanded to downsize the battery itself and efficiently use a housing space within the portable electronic appliance.

It is known that as a battery which meets such demands, a lithium ion secondary battery having a large energy density is the most suitable.

As such a lithium ion secondary battery, for example, one using a laminated film for an exterior member is put into practical use in view of the facts that it is lightweight and has a high energy density and that a battery having an extremely thin shape can be manufactured and the like.

In a battery using a laminated film as an exterior member, for the purposes of achieving the resistance to liquid leakage and the like, it is performed to apply, as an electrolyte, an electrolytic solution and a matrix resin for holding the electrolytic solution therein, and such a battery is known as a polymer battery.

In such a polymer battery, a degree of shape freedom is largely enhanced by using an aluminum laminated film for the exterior member. On the other hand, there is a possibility that the strength is insufficient so that when a strong force is impressed due to the misuse, deformation is easy to occur.

In that case, so far as such a polymer battery is covered by a firm exterior pack, there is no problem. However, in recent years, following the requirement for realizing a high capacity, the exterior pack becomes simple; and when the deformation is large, a short circuit is easily generated in the inside of the battery, resulting in bringing a possibility that the resultant does not work as a battery.

In order to cope with such problems, there has hitherto been proposed a battery obtained by coating a ceramic on the surface of an electrode (see, for example, JP-A-10-214640).

SUMMARY OF THE INVENTION

However, in the battery disclosed in JP-A-10-214640, though the strength (load) until a short circuit is generated can be increased, impregnation properties of the electrolytic solution into an electrode is easily lowered, and as a result, there is a concern that battery characteristics are remarkably lowered.

The present invention addresses the above-identified and other problems associated with conventional technologies.

It is desirable to provide a nonaqueous electrolyte composition capable of increasing a strength (load) until a short circuit is generated without remarkably lowering battery characteristics, or capable of enhancing battery characteristics without remarkably lowering a strength (load) until a short circuit is generated, and a nonaqueous electrolyte secondary battery using the same.

In order to achieve such a desire, the present inventors made extensive and intensive investigations.

As a result, it has been found that the foregoing desire can be achieved by forming a nonaqueous electrolyte so as to contain a matrix resin, a filler and a surfactant or to contain a matrix resin and a filler containing a prescribed aluminum oxide, leading to accomplishment of embodiments according to the present invention.

That is, a nonaqueous electrolyte composition according an embodiment of the present invention is a composition containing a nonaqueous solvent, an electrolyte salt, a matrix resin, a filler and a surfactant.

Also, a nonaqueous electrolyte composition according to another embodiment of the present invention is a composition containing a nonaqueous solvent, an electrolyte salt, a matrix resin and a filler containing at least an aluminum oxide, wherein the aluminum oxide is an aluminum oxide having an alpha-conversion rate of 80% or more.

Furthermore, a nonaqueous electrolyte secondary battery according to still an embodiment of the present invention is a battery including a positive electrode, a negative electrode, a separator and a nonaqueous electrolyte composition, wherein the nonaqueous electrolyte composition is a composition containing a nonaqueous solvent, an electrolyte salt, a matrix resin, a filler and a surfactant.

Moreover, a nonaqueous electrolyte secondary battery according to yet another embodiment of the present invention is a battery including a positive electrode, a negative electrode, a separator and a nonaqueous electrolyte composition, wherein the nonaqueous electrolyte composition is a composition containing a nonaqueous solvent, an electrolyte salt, a matrix resin and a filler containing at least an aluminum oxide; and the aluminum oxide is an aluminum oxide having an alpha-conversion rate of 80% or more.

According to the embodiments of the present invention, since the nonaqueous electrolyte is formed so as to contain a matrix resin, a filler and a surfactant or to contain a matrix resin and a filler containing a prescribed aluminum oxide, both high battery characteristic and high short-circuit load characteristics can be made compatible with each other. That is, according to the embodiments of the present invention, a nonaqueous electrolyte composition capable of increasing a strength (load) until a short circuit is generated without remarkably lowering battery characteristics, or capable of enhancing battery characteristics without remarkably lowering a strength (load) until a short circuit is generated, and a nonaqueous electrolyte secondary battery using the same can be provided.

DESCRIPTION OF THE PREFERRED EMBODIMENTS

Figure 1:
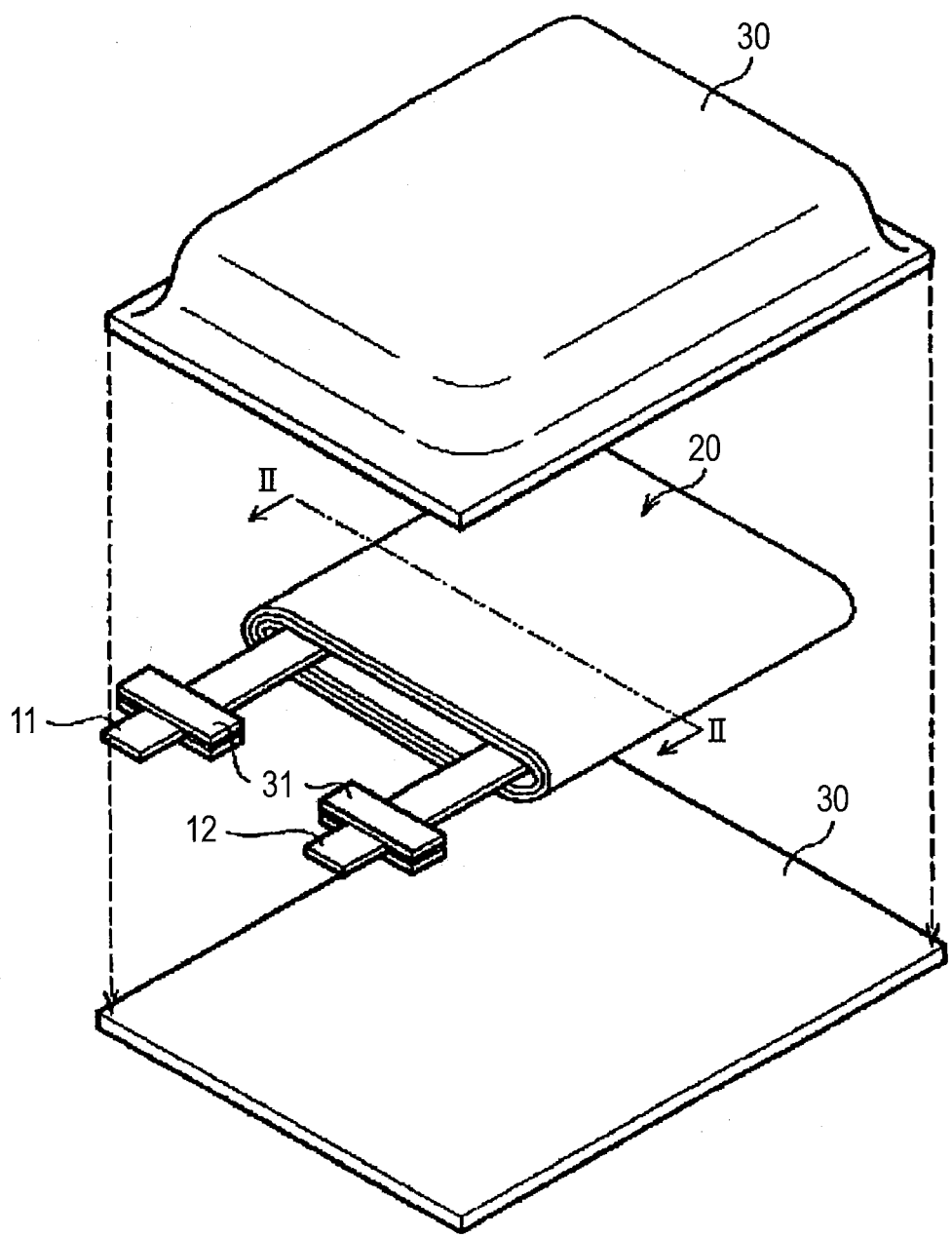
FIG. 1 is an exploded perspective view showing an example of a nonaqueous electrolyte secondary battery according to an embodiment of the present invention.

Each mode for carrying out the present invention (hereinafter referred to as "embodiment") is hereunder described. The explanation is made in the following order.
1. First Embodiment (an example of the first nonaqueous electrolyte composition)
2. Second Embodiment (an example of the second nonaqueous electrolyte composition)
3. Third or Fourth Embodiment (an example of the first or second nonaqueous electrolyte secondary battery)

1. First Embodiment

The first nonaqueous electrolyte composition according to the First Embodiment is a composition containing a nonaqueous solvent, an electrolyte salt, a matrix resin, a filler and a surfactant and is suitably used for a nonaqueous electrolyte secondary battery.
[Nonaqueous Solvent]

A variety of high-dielectric solvents and low-viscosity solvents can be used as the nonaqueous solvent.

As the high-dielectric solvent, a solvent containing ethylene carbonate and propylene carbonate can be exemplified as a suitable example, but it should not be construed that the high-dielectric solvent is limited thereto.

Examples of the high-dielectric solvent include cyclic carbonates such as butylene carbonate, vinylene carbonate, 4-fluoro-1,3-dioxolan-2-one (fluoroethylene carbonate), 4-chloro-1,3-dioxolan-2-one (chloroethylene carbonate) and trifluoromethylethylene carbonate.

Also, as the high-dielectric solvent, lactones such as γ-butyrolactone and γ-valerolactone; lactams such as N-methylpyrrolidone; cyclic carbamates such as N-methyloxazolidinone; sulfone compounds such as tetramethylene sulfone; and the like can be used in place of or together with the cyclic carbonate.

On the contrary, examples of the low-viscosity solvent include chain carbonates such as dimethyl carbonate, ethyl methyl carbonate, diethyl carbonate and methyl propyl carbonate; chain carboxylic acid esters such as methyl acetate, ethyl acetate, methyl propionate, ethyl propionate, methyl butyrate, methyl isobutyrate, methyl trimethylacetate and ethyl trimethylacetate; chain amides such as N,N-dimethylacetamide; chain carbamates such as methyl N,N-diethylcarbamate and ethyl N,N-diethylcarbomate; and ethers such as 1,2-dimethoxyethane, tetrahydrofuran, tetrahydropyran and 1,3-dioxolane.

The foregoing high-dielectric solvent and low-viscosity solvent can be used singly or as an arbitrary mixture of two or more kinds thereof.

Also, a content of the nonaqueous solvent is preferably from 70 to 90% by mass. When the content of the nonaqueous solvent is less than 70% by mass, there is a concern that the viscosity excessively increases, whereas when it exceeds 90% by mass, it may be impossible to obtain sufficient conductivity.
[Electrolyte Salt]

As the electrolyte salt, any material is useful so far as it is dissolved or dispersed in the foregoing nonaqueous solvent to generate an ion, and lithium hexafluorophosphate ($LiPF_6$) can be suitably used. However, needless to say, it should not be construed that the electrolyte salt is limited thereto.

For example, inorganic lithium salts such as lithium tetrafluoroborate ($LiBF_4$), lithium hexafluoroarsenate ($LiAsF_6$), lithium hexafluoroantimonate ($LiSbF_6$), lithium perchlorate ($LiClO_4$) and lithium tetrachloroaluminate ($LiAlCl_4$); lithium salts of perfluoroalkanesulfonic acid derivatives such as lithium trifluoromethanesulfonate ($LiCF_3SO_3$), lithium bis(trifluoromethanesulfone)imide ($LiN(CF_3SO_2)_2$), lithium bis(pentafluoroethanesulfone) methide ($LiC(C_2F_5SO_2)_2$) and lithium tris(trifluoromethanesulfone)methide ($LiC(CF_3SO_2)_3$); and the like are useful. These lithium salts can be used singly or as an arbitrary mixture of two or more kinds thereof.

A content of the electrolyte salt is preferably from 10 to 30% by mass. When the content of the electrolyte salt is less than 10% by mass, it may be impossible to obtain sufficient conductivity, whereas when it exceeds 30% by mass, there is a concern that the viscosity excessively increases.
[Matrix Resin]

The matrix resin is not particularly limited so far as it is able to impregnate therewith or hold therein the foregoing nonaqueous solvent, the foregoing electrolyte salt, the following filler and the following surfactant. For example, polymers (that is, homopolymers, copolymers and multi-component copolymers) containing, as a constituent component, vinylidene fluoride, hexafluoropropylene, polytetrafluoroethylene, etc. are preferable. Specific examples thereof include polyvinylidene fluoride (PVdF), a polyvinylidene fluoride-hexafluoropropylene copolymer (PVdF-HFP) and a polyvinylidene fluoride-hexafluoropropylene-chlorotrifluoroethylene copolymer (PVdF-HFP-CTFE).

The matrix resin includes a matrix resin which impregnates therewith or holds therein the foregoing nonaqueous solvent and electrolyte salt, thereby causing swelling, gelation or immobilization. Also, according to this, the liquid leakage of the nonaqueous electrolyte in the obtained battery can be suppressed.

Also, a content of the matrix resin is preferably from 4 to 15% by mass. In the case where the content of the matrix resin is less than 4% by mass, it may be impossible to gelate the nonaqueous electrolyte composition, and it may be impossible to uniformly hold the filler therein. On the other hand, in the case where the content of the matrix resin exceeds 15% by mass, there is a possibility that the battery characteristics are affected, for example, the energy density is reduced.
[Filler]

A variety of inorganic fillers and organic fillers can be used as the filler.

Such a filler is desirably a ceramic powder in which a concentration of the total sum of impurities such as iron, copper, silicon, sodium, magnesium and zirconium (however, in the case where the ceramic powder contains zirconium oxide, zirconium is excluded; and in the case where the ceramic power contains magnesium oxide, magnesium is excluded) is not more than 100 ppm. In the case where the concentration of the total sum of the impurities exceeds 100 ppm, there is a concern that the cycle characteristic in the battery characteristics is lowered.

Examples of the inorganic filler include ceramic powders such as aluminum oxide ($Al_2O_3$), zirconium oxide ($ZrO_2$), titanium oxide ($TiO_2$) and magnesium oxide (MgO). These ceramic powders can be used singly or as an arbitrary mixture of two or more kinds thereof.

As the aluminum oxide, for example, it is preferable to use an aluminum oxide having an alpha-conversion rate of 80% or more. When the alpha-conversion rate of the aluminum oxide is 80% or more, the battery characteristics can be more enhanced.

On the contrary, the organic filler is not particularly limited so far as it has a high strength in the copresence of a nonaqueous solvent as compared with the matrix resin. Examples thereof include resin powers such as PTFE (polytetrafluoroethylene), PI (polyimide) and an ABS resin.

As the filler, the foregoing inorganic filler and organic filler can be used singly or as an arbitrary mixture of two or more kinds thereof.

[Surfactant]

As the surfactant, any material is useful so far as it is able to disperse the filler therein, and suitable examples thereof include hydrocarbon based surfactants and silicone based surfactants. Nonionic hydrocarbon based surfactants and nonionic silicone based surfactants are especially desirable because they do not generate an ion.

Examples of the hydrocarbon based surfactant include nonionic hydrocarbon based surfactants such as polyoxyethylene alkyl ethers, polyoxyethylene alkyl phenyl ethers, alkylpyrrolidones (for example, 1-octyl-2-pyrrolidone, etc.), alkyl glucosides, sorbitan fatty acid esters, mono- or diethanolamine fatty acid amides, polyoxyethylene adducts of alkylamines, ethoxylated tetramethyldodecinediol, tetramethyldecinediol, glycerin fatty acid esters, pentaerythritol fatty acid esters, polyoxyethylene polyoxypropylene glycol, polyethylene glycol fatty acid esters and fatty acid polyoxyethylene sorbitans.

Examples of the polyoxyethylene alkyl ether include polyoxyethylene lauryl ether, polyoxyethylene stearyl ether and polyoxyethylene oleyl ether.

Also, examples of the polyoxyethylene alkyl phenyl ether include polyoxyethylene octyl phenyl ether and polyoxyethylene nonyl phenyl ether.

Furthermore, examples of the polyethylene glycol fatty acid ester include polyethylene glycol dilaurate and polyethylene glycol distearate.

On the contrary, examples of the silicone based surfactant include nonionic silicone based surfactants such as dimethyl silicone, aminosilane, acrylsilane, vinylbenzylsilane, vinylbenzylaminosilane, glycidosilane, mercaptosilane, dimethylsilane, polydimethylsiloxane, polyalkoxysiloxanes, hydrodiene-modified siloxanes, vinyl-modified siloxanes, hydroxymodified siloxanes, amino-modified siloxanes, carboxylmodified siloxanes, halogenated modified siloxanes, epoxymodified siloxanes, methacryloxy-modified siloxanes, mercapto-modified siloxanes, fluorine-modified siloxanes, alkyl group-modified siloxanes, phenyl-modified siloxanes and alkylene oxide-modified siloxanes.

The foregoing hydrocarbon based surfactant and silicone based surfactant can be used singly or as an arbitrary mixture of two or more kinds thereof.

Also, a content of the surfactant is preferably from 0.3 to 5.0 parts by mass based on 100 parts by mass of the filler. When the content of the surfactant falls within the foregoing range, the strength (load) until a short circuit is generated can be more increased without substantially lowering the battery characteristics.

2. Second Embodiment

The second nonaqueous electrolyte composition according to the Second Embodiment is a composition containing a nonaqueous solvent, an electrolyte salt, a matrix resin and a filler containing at least an aluminum oxide.

Also, the aluminum oxide is an aluminum oxide having an alpha-conversion rate of 80% or more.

Such a nonaqueous electrolyte composition is suitably used for a nonaqueous electrolyte secondary battery.

The nonaqueous solvent and the electrolyte salt in the second nonaqueous electrolyte composition according to the Second Embodiment are the same as those described above, and therefore, explanations thereof are omitted.

[Matrix Resin]

The matrix resin is not particularly limited so far as it is able to impregnate therewith or hold therein the foregoing nonaqueous solvent, the foregoing electrolyte salt and the following filler. For example, polymers (that is, homopolymers, copolymers and multi-component copolymers) containing, as a constituent component, vinylidene fluoride, hexafluoropropylene, polytetrafluoroethylene, etc. are preferable. Specific examples thereof include polyvinylidene fluoride (PVdF), a polyvinylidene fluoride-hexafluoropropylene copolymer (PVdF-HFP) and a polyvinylidene fluoride-hexafluoropropylene-chlorotrifluoroethylene copolymer (PVdF-HFP-CTFE).

The matrix resin includes a matrix resin which impregnates therewith or holds therein the foregoing nonaqueous solvent and electrolyte salt, thereby causing swelling, gelation or immobilization. Also, according to this, the liquid leakage of the nonaqueous electrolyte in the obtained battery can be suppressed.

Also, a content of the matrix resin is preferably from 4 to 15% by mass. In the case where the content of the matrix resin is less than 4% by mass, it may be impossible to gelate the nonaqueous electrolyte composition, and it may be impossible to uniformly hold the filler therein. On the other hand, in the case where the content of the matrix resin exceeds 15% by mass, there is a possibility that the battery characteristics are affected, for example, the energy density is reduced.

[Filler]

The filler is a material containing at least an aluminum oxide ($Al_2O_3$), with an alpha-conversion rate of the aluminum oxide being 80% or more. In addition to the aluminum oxide having an alpha-conversion rate of 80% or more, the filler may also contain other inorganic filler or organic filler together therewith.

Such a filler is desirably a ceramic powder in which a concentration of the total sum of impurities such as iron, copper, silicon, sodium, magnesium and zirconium (however, in the case where the ceramic powder contains zirconium oxide, zirconium is excluded; and in the case where the ceramic power contains magnesium oxide, magnesium is excluded) is not more than 100 ppm. In the case where the concentration of the total sum of the impurities exceeds 100 ppm, there is a concern that the cycle characteristic in the battery characteristics is lowered.

Examples of the inorganic filler to be contained together with the aluminum oxide include ceramic powders such as zirconium oxide ($ZrO_2$), titanium oxide ($TiO_2$) and magnesium oxide (MgO). These ceramic powders can be used singly or as an arbitrary mixture of two or more kinds thereof together with the aluminum oxide having an alpha-conversion rate of 80% or more.

On the contrary, the organic filler to be contained together with the aluminum oxide is not particularly limited so far as it has a high strength in the copresence of a nonaqueous solvent as compared with the matrix resin. Examples thereof include resin powers such as PTFE (polytetrafluoroethylene), PI (polyimide) and an ABS resin. These resin powders can be used singly or as an arbitrary mixture of two or more kinds thereof together with the aluminum oxide having an alpha-conversion rate of 80% or more.

For example, the nonaqueous electrolyte composition may contain, as other component, a surfactant capable of dispersing the foregoing filler therein.

Suitable examples of such a surfactant include hydrocarbon based surfactants and silicone based surfactants. Nonionic hydrocarbon based surfactants and nonionic silicone based surfactants are especially desirable because they do not generate an ion.

Examples of the hydrocarbon based surfactant include nonionic hydrocarbon based surfactants such as polyoxyethylene alkyl ethers, polyoxyethylene alkyl phenyl ethers, alkylpyrrolidones (for example, 1-octyl-2-pyrrolidone, etc.), alkyl glucosides, sorbitan fatty acid esters, mono- or diethanolamine fatty acid amides, polyoxyethylene adducts of alkylamines, ethoxylated tetramethyldodecinediol, tetramethyldecinediol, glycerin fatty acid esters, pentaerythritol fatty acid esters, polyoxyethylene polyoxypropylene glycol, polyethylene glycol fatty acid esters and fatty acid polyoxyethylene sorbitans.

Examples of the polyoxyethylene alkyl ether include polyoxyethylene lauryl ether, polyoxyethylene stearyl ether and polyoxyethylene oleyl ether.

Also, examples of the polyoxyethylene alkyl phenyl ether include polyoxyethylene octyl phenyl ether and polyoxyethylene nonyl phenyl ether.

Furthermore, examples of the polyethylene glycol fatty acid ester include polyethylene glycol dilaurate and polyethylene glycol distearate.

On the contrary, examples of the silicone based surfactant include dimethyl silicone, aminosilane, acrylsilane, vinylbenzylsilane, vinylbenzylaminosilane, glycidosilane, mercaptosilane, dimethylsilane, polydimethylsiloxane, polyalkoxysiloxanes, hydrodiene-modified siloxanes, vinyl-modified siloxanes, hydroxy-modified siloxanes, amino-modified siloxanes, carboxyl-modified siloxanes, halogenated modified siloxanes, epoxy-modified siloxanes, methacryloxy-modified siloxanes, mercapto-modified siloxanes, fluorine-modified siloxanes, alkyl group-modified siloxanes, phenyl-modified siloxanes and alkylene oxide-modified siloxanes.

The foregoing hydrocarbon based surfactant and silicone based surfactant can be used singly or as an arbitrary mixture of two or more kinds thereof.

Also, a content of the surfactant is preferably from 0.3 to 5.0 parts by mass based on 100 parts by mass of the filler. When the content of the surfactant falls within the foregoing range, the strength (load) until a short circuit is generated can be more increased without substantially lowering the battery characteristics.

3. Third or Fourth Embodiment

Constitution of Nonaqueous Electrolyte Secondary Battery

FIG. 1 is an exploded perspective view showing an example of the nonaqueous electrolyte secondary battery according to an embodiment of the present invention.

As shown in FIG. 1, this secondary battery is constituted such that a battery element 20 having a positive electrode terminal 11 and a negative electrode terminal 12 installed therein is enclosed in the inside of an exterior member 30 in a film form. The positive electrode terminal 11 and the negative electrode terminal 12 are led out from the inside toward the outside of the exterior member 30 in, for example, the same direction, respectively. Each of the positive electrode terminal 11 and the negative electrode terminal 12 is, for example, constituted of a metal material such as aluminum (Al), copper (Cu), nickel (Ni) and stainless steel.

The exterior member 30 is, for example, constituted of a rectangular laminated film prepared by sticking a nylon film, an aluminum foil and a polyethylene film in this order. The exterior member 30 is, for example, disposed such that the side of the polyethylene film and the battery element 20 are opposed to each other, and respective outer peripheries are joined to each other by means of fusion or with an adhesive.

A contact film 31 is inserted between the exterior member 30 and each of the positive electrode terminal 11 and the negative electrode terminal 12 for the purpose of preventing invasion of the outside air from occurring. The contact film 31 is constituted of a material having adhesion to each of the positive electrode terminal 11 and the negative electrode terminal 12. For example, in the case where each of the positive electrode terminal 11 and the negative electrode terminal 12 is constituted of the foregoing metal material, it is preferable that each of the positive electrode terminal 11 and the negative electrode terminal 12 is constituted of a polyolefin resin such as polyethylene, polypropylene, modified polyethylene and modified polypropylene.

The exterior member 30 may be constituted of a laminated film having other structure, for example, a metal material-free laminated film, a polymer film such as polypropylene, a metal film or the like, in place of the foregoing laminated film.

Here, a general constitution of the laminated film can be represented by a laminated structure of (exterior layer)/(metal foil)/(sealant layer) (however, each of the exterior layer and the sealant layer may be constituted of plural layers). In the foregoing example, the nylon film is corresponding to the exterior layer; the aluminum foil is corresponding to the metal foil; and the polyethylene film is corresponding to the sealant layer.

The metal foil is enough to function as a moisture permeation resistant barrier film, and not only an aluminum foil but a stainless steel foil, a nickel foil, a plated iron foil and the like can be used. Of these, an aluminum foil which is thin, lightweight and excellent in processability can be suitably used.

When a constitution which can be used as the exterior member is enumerated in a mode of (exterior layer)/(metal foil)/(sealant layer), there are exemplified Ny (nylon)/Al (aluminum)/CPP (cast polypropylene), PET (polyethylene terephthalate)/Al/CPP, PET/Al/PET/CPP, PET/Ny/Al/CPP, PET/Ny/Al/Ny/CPP, PET/Ny/Al/Ny/PE (polyethylene), Ny/PE/Al/LLDPE (linear low density polyethylene), PET/PE/Al/PET/LDPE (low density polyethylene) and PET/Ny/Al/LDPE/CPP.

[Constitution of Battery Element]

Figure 2:
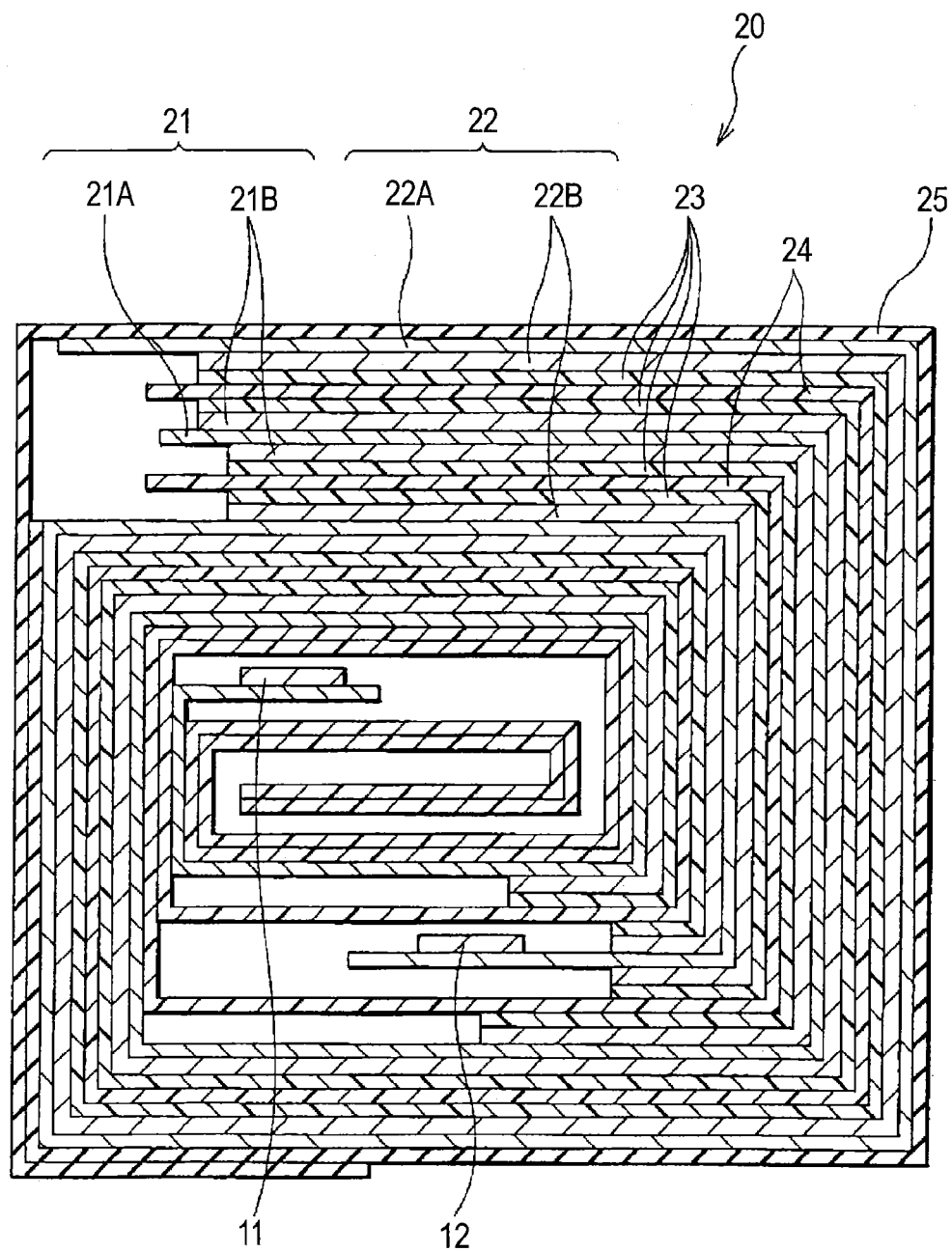
FIG. 2 is a schematic sectional view along an II-II line of a battery element shown in FIG. 1.

FIG. 2 is a schematic sectional view along an II-II line of the battery element 20 shown in FIG. 1. In FIG. 2, in the battery element 20, a positive electrode 21 and a negative electrode 22 are located opposite to each other via a nonaqueous electrolyte composition layer 23 composed of the foregoing first nonaqueous electrolyte composition or second nonaqueous electrolyte composition and a separator 24 and wound, and an outermost peripheral part of the battery element 20 is protected by a protective tape 25.

The first nonaqueous electrolyte composition in the first nonaqueous electrolyte secondary battery according to the Third Embodiment and the second nonaqueous electrolyte composition in the second nonaqueous electrolyte secondary battery according to the Fourth Embodiment are the same as those described above, respectively, and therefore, explanations thereof are omitted.

[Positive Electrode]

Here, for example, the positive electrode 21 has a structure in which a positive electrode active material layer 21B is coated on the both surfaces or one surface of a positive electrode collector 21A having a pair of surfaces opposing to each other. The positive electrode collector 21A includes an exposed portion without being provided with the positive electrode active material layer 21B in one end in a longitudinal direction, and the positive electrode terminal 11 is installed in this exposed portion.

The positive electrode collector 21A is, for example, constituted of a metal foil such as an aluminum foil, a nickel foil and a stainless steel foil.

The positive electrode active material layer 21B contains, as a positive electrode active material, any one kind or two or more kinds of a positive electrode material capable of intercalating and deintercalating a lithium ion and may further contain a conductive agent and a binder, if desired.

Examples of the positive electrode material capable of intercalating and deintercalating a lithium ion include lithium-free chalcogen compounds (especially, layered compounds and spinel type compounds), for example, oxides such as vanadium oxide ($V_2O_5$), titanium dioxide ($TiO_2$) and manganese dioxide ($MnO_2$), sulfur (S), disulfides such as iron disulfide ($FeS_2$), titanium disulfide ($TiS_2$) and molybdenum disulfide ($MoS_2$) and niobium diselenide ($NbSe_2$); lithium-containing compounds containing lithium therein; and conductive polymer compounds, for example, polyaniline, polythiophene, polyacetylene and polypyrrole.

Of these, lithium-containing compounds are preferable because they include a compound capable of obtaining high voltage and high energy density. Examples of such a lithium-containing compound include complex oxides containing lithium and a transition metal element; and phosphate compounds containing lithium and a transition metal. From the viewpoint of obtaining a higher voltage, those containing cobalt (Co), nickel (Ni), manganese (Mn), iron (Fe), copper (Cu), zinc (Zn), chromium (Cr), vanadium (V), titanium (Ti) or an arbitrary mixture thereof are preferable.

Such a lithium-containing compound is representatively represented by the following general formula (1) or (2):

$$Li_rM^IO_2 \quad (1)$$

$$Li_sM^{II}PO_4 \quad (2)$$

In the formulae (1) and (2), each of $M^I$ and $M^{II}$ represents one or more kinds of a transition metal element; and values of r and s vary depending upon the charge and discharge state of the battery and are usually satisfied with the relationships of ($0.05 \leq r \leq 1.10$) and ($0.05 \leq s \leq 1.10$), respectively. The compound of the formula (1) generally has a layered structure; and the compound of the formula (2) generally has an olivine structure.

Also, specific examples of the complex oxide containing lithium and a transition metal element include a lithium cobalt complex oxide ($LiCoO_2$); a lithium nickel complex oxide ($LiNiO_2$) and a solid solution thereof ($Li(Ni_tCo_uMn_v)O_2$ ($0<t<1$, $0<u<1$, $0<v<1$ and (t+u+v)=1)); a lithium nickel cobalt complex oxide ($LiNi_{1-w}Co_wO_2$ ($0<w<1$)); and a lithium manganese complex oxide having a spinel type structure ($LiMn_2O_4$) and a solid solution thereof ($Li(Mn_{2-x}Ni_y)O_4$ ($0<x<2$ and $0<y<2$).

Specific examples of the phosphate compound containing lithium and a transition metal element include a lithium iron phosphate compound having an olivine structure ($LiFePO_4$) and a lithium iron manganese phosphate compound ($LiFe_{1-z}Mn_zPO_4$ ($0<z<1$)).

The conductive agent is not particularly limited so far as it is able to impart conductivity to the positive active material upon being mixed in an appropriate amount. Examples thereof include carbon materials such as graphite, carbon black and ketjen black. These materials are used singly or in admixture of two or more kinds thereof. Also, in addition to the carbon material, a metal material or a conductive polymer material or the like may be used so far as it is a material having conductivity.

As the binder, known binders which are usually used in a positive electrode mixture of a battery of this type are useful. Preferred examples of the binder include fluorine based polymers such as polyvinyl fluoride, polyvinylidene fluoride and polytetrafluoroethylene; and synthetic rubbers such as a styrene-butadiene based rubber, a fluorine based rubber and an ethylene-propylene-diene rubber. These materials are used singly or in admixture of two or more kinds thereof.

[Negative Electrode]

On the contrary, similar to the positive electrode 21, the negative electrode 22 has, for example, a structure in which a negative electrode active material layer 22B is provided on the both surfaces or one surface of a negative electrode collector 22A having a pair of surfaces opposing to each other. The negative electrode collector 22A includes an exposed portion without being provided with the negative electrode active material layer 22B in one end in a longitudinal direction, and the negative electrode terminal 12 is installed in this exposed portion.

The negative electrode collector 22A is, for example, constituted of a metal foil such as a copper foil, a nickel foil and a stainless steel foil.

The negative electrode active material layer 22B contains, as a negative electrode active material, any one kind or two or more kinds of a negative electrode material capable of intercalating and deintercalating a lithium ion and metallic lithium and may further contain a conductive agent and a binder, if desired.

Examples of the negative electrode material capable of intercalating and deintercalating a lithium ion include carbon materials, metal oxides and polymer compounds.

Examples of the carbon material include hardly graphitized carbon materials, artificial graphite materials and graphite based materials. More specific examples thereof include pyrolytic carbons, cokes, graphites, vitreous carbons, organic polymer compound burned materials, carbon fibers, active carbon and carbon black. Of these, examples of the coke include pitch coke, needle coke and petroleum coke. The organic polymer compound burned material as referred to herein is a material obtained through carbonization by burning a polymer material, for example, phenol resins and furan resins at an appropriate temperature.

Also, examples of the metal oxide include iron oxide, ruthenium oxide and molybdenum oxide; and examples of the polymer material include polyacetylene and polypyrrole.

Furthermore, examples of the negative electrode material capable of intercalating and deintercalating a lithium ion include materials containing, as a constituent element, at least one of metal elements and semi-metal elements capable of forming an alloy together with lithium. This negative electrode material may be a simple substance, an alloy or a compound of a metal element or a semi-metal element. Also, a material having one or two or more kinds of a phase in at least a part thereof may be used.

In an embodiment according to the present invention, the alloy also includes an alloy containing one or two or more kinds of a metal element and one or two or more kinds of a semi-metal element in addition to alloys composed of two or more kinds of a metal element. Also, the alloy may contain a non-metal element. Examples of its texture include a solid solution, a eutectic (eutectic mixture), an intermetallic compound and one in which two or more kinds thereof coexist.

Examples of such a metal element or semi-metal element include tin (Sn), lead (Pb), magnesium (Mg), aluminum, indium (In), silicon (Si), zinc (Zn), antimony (Sb), bismuth (Bi), gallium (Ga), germanium (Ge), arsenic (As), silver (Ag), hafnium (Hf), zirconium (Zr) and yttrium (Y).

Above all, a metal element or a semi-metal element belonging to the Group 14 of the long form of the periodic table is preferable; and silicon and tin are especially preferable. This is because silicon and tin have large capability to intercalate and deintercalate lithium and are able to obtain a high energy density.

Examples of alloys of tin include alloys containing, as a second constituent element other than tin, at least one member selected from the group consisting of silicon, magnesium, nickel, copper, iron, cobalt, manganese, zinc, indium, silver, titanium, germanium, bismuth, antimony and chromium (Cr).

Examples of alloys of silicon include alloys containing, as a second constituent element other than silicon, at least one member selected from the group consisting of tin, magnesium, nickel, copper, iron, cobalt, manganese, zinc, indium, silver, titanium, germanium, bismuth, antimony and chromium.

Examples of compounds of tin or silicon include compounds containing oxygen (O) or carbon (C), and these compounds may contain the foregoing second constituent element in addition to tin or silicon.

Furthermore, the negative electrode material may be an element capable of forming a complex oxide with lithium, such as titanium. As a matter of course, metallic lithium may be deposited and dissolved, or magnesium or aluminum other than lithium can be deposited and dissolved.

As the conductive agent and the binder, the same materials as those used in the positive electrode are useful.

[Separator]

Also, the separator 24 is, for example, constituted of an insulating thin film having large ion permeability and prescribed mechanical strength, such as a porous film composed of a polyolefin based synthetic resin (for example, polypropylene, polyethylene, etc.) and a porous film composed of an inorganic material (for example, a ceramic-made nonwoven fabric, etc.), and may have a structure in which two or more kinds of such a porous film are laminated. In particular, one including a polyolefin based porous film is suitable because it is excellent in separability between the positive electrode 21 and the negative electrode 22 and is able to more reduce an internal short circuit or a lowering of an open-circuit voltage.

[Preparation of Nonaqueous Electrolyte Secondary Battery]

Next, an example of a manufacturing method of the foregoing nonaqueous electrolyte secondary battery is described.

First of all, the positive electrode 21 is prepared. For example, in the case of using a granular positive electrode active material, the positive electrode active material is mixed with a conductive agent and a binder, if desired, to prepare a positive electrode mixture, which is then dispersed in a dispersion medium such as N-methyl-2-pyrrolidone to prepare a positive electrode mixture slurry.

Subsequently, this positive electrode mixture slurry is coated on the positive electrode collector 21A, dried and then compression molded to form the positive electrode active material layer 21B.

Also, the negative electrode 22 is prepared. For example, in the case of using a granular negative electrode active material, the negative electrode active material is mixed with a conductive agent and a binder, if desired, to prepare a negative electrode mixture, which is then dispersed in a dispersion medium such as N-methyl-2-pyrrolidone to prepare a negative electrode mixture slurry. Thereafter, this negative electrode mixture slurry is coated on the negative electrode collector 22A, dried and then compression molded to form the negative electrode active material layer 22B.

Subsequently, not only the positive electrode terminal 11 is installed in the positive electrode 21, but the negative electrode terminal 12 is installed in the negative electrode 22. Thereafter, the negative electrode 22, the separator 24, the positive electrode 21 and the separator 24 are successively laminated and wound, and the protective tape 25 is allowed to adhere to an outermost peripheral part of the wound laminate, thereby forming a wound electrode body. Furthermore, this wound electrode body is interposed between laminated films as an example of the exterior member 30, and the outer edges exclusive of one side are subjected to heat fusion to form a bag.

Thereafter, the foregoing nonaqueous electrolyte composition is prepared and injected into the inside of the wound electrode body from an opening of the laminated film, and the opening of the laminated film is then subjected to heat fusion and enclosed therein. According to this, the nonaqueous electrolyte composition layer 23 is formed, thereby completing the nonaqueous electrolyte secondary battery shown in FIGS. 1 and 2.

This nonaqueous electrolyte secondary battery may also be manufactured in the following manner.

For example, the foregoing nonaqueous electrolyte composition is not injected after preparing the wound electrode body; but the nonaqueous electrolyte secondary battery may be prepared by coating the nonaqueous electrolyte composition on each of the positive electrode 21 and the negative electrode 22 or the separator 24 and winding to prepare a wound electrode body and then enclosing the wound electrode body in the inside of the laminated film.

Also, for example, the nonaqueous electrolyte composition layer 23 may be formed by coating a solution of a monomer or polymer of the matrix polymer (for example, the foregoing polyvinylidene fluoride, etc.) on each of the negative electrode 21 and the positive electrode 22 or the separator 24 and winding to prepare a wound electrode body, housing the wound electrode body in the inside of the exterior member 30 composed of a laminated film and then injecting other component of the foregoing nonaqueous electrolyte composition thereinto.

However, what the monomer is polymerized in the inside of the exterior member 30 is preferable because welding properties between the nonaqueous electrolyte composition layer 23 and the separator 24 are enhanced, thereby enabling one to make the internal resistance low. Also, why the nonaqueous electrolyte composition or the like is injected into the inside of the exterior member 30 to form the nonaqueous electrolyte composition layer 23 is preferable because the nonaqueous electrolyte secondary battery can be simply manufactured by a smaller number of steps.

[Explanation of Action]

In the nonaqueous electrolyte secondary battery which has been described above, when charged, a lithium ion is deintercalated from the positive electrode active material layer 21B and intercalated into the negative electrode active material layer 22B via the nonaqueous electrolyte composition layer 23. When discharged, a lithium ion is deintercalated from the negative electrode active material layer 22B and intercalated into the positive electrode active material layer 21B via the nonaqueous electrolyte composition layer 23.

EXAMPLES

The present invention is hereunder described in more detail with reference to the following Examples and Comparative Examples, but it should not be construed that the present invention is limited to only these Examples and Comparative Examples.

Specifically, operations described in each of the following Examples and Comparative Examples were performed, thereby preparing the nonaqueous electrolyte secondary battery shown in FIGS. 1 and 2, and performances thereof were evaluated.

Example 1-1-1

Preparation of Positive Electrode

First of all, 91 parts by mass of a lithium cobalt complex oxide ($LiCoO_2$) as a positive electrode active material, 6 parts by mass of graphite as a conductive agent and 10 parts by mass of polyvinylidene fluoride (PVdF) as a binder were uniformly mixed, and the mixture was dispersed in N-methyl-2-pyrrolidone (NMP) to obtain a positive electrode mixture slurry.

Subsequently, the obtained positive electrode mixture slurry was uniformly coated on the both surfaces of a 20 μm-thick strip-shaped aluminum foil serving as a positive electrode collector and dried to form a positive electrode active material layer. This was cut into a shape having a size of 38 mm in width and 700 mm in length, thereby preparing a positive electrode. A positive electrode terminal was further installed in the positive electrode.
(Preparation of Negative Electrode)

Next, 90 parts by mass of artificial graphite as a negative electrode active material and 10 parts by mass of PVdF as a binder were uniformly mixed, and the mixture was dispersed in NMP to obtain a negative electrode mixture slurry.

Subsequently, the obtained negative electrode mixture slurry was uniformly coated on the both surfaces of a 10 μm-thick strip-shaped copper foil serving as a negative electrode collector and dried to form a negative electrode mixture layer. This was cut into a shape having a size of 40 mm in width and 650 mm in length, thereby preparing a negative electrode. A negative electrode terminal was further installed in the negative electrode.
(Preparation of Nonaqueous Electrolyte Composition)

Also, a composition prepared by mixing 90 parts by mass of a nonaqueous electrolytic solution, 10 parts by mass of a polyvinylidene fluoride-hexafluoropropylene copolymer (PVdF/HFP=93.1/6.9 (mass ratio)) as a matrix resin, 10 parts by mass of an aluminum oxide (concentration of impurities: 55 ppm, alpha-conversion rate: 90%) as a filler and 0.2 parts by mass, based on 100 parts by mass of the filler, of a hydrocarbon based surfactant (nonionic polyoxyethylene lauryl ether) as a surfactant and dispersing the mixture was used as a nonaqueous electrolyte composition.

A solution prepared by dissolving lithium hexafluorophosphate ($LiPF_6$) as an electrolyte salt in a concentration of 0.8 moles/kg in a nonaqueous solvent prepared by mixing ethylene carbonate and propylene carbonate in a proportion of ethylene carbonate to propylene carbonate of 6/4 (mass ratio) was used as the nonaqueous electrolytic solution.

Also, at that time, a dispersing time was 30 minutes.
(Preparation of Nonaqueous Electrolyte Secondary Battery)

The obtained positive electrode and negative electrode were each coated with the obtained nonaqueous electrolyte composition, laminated via a 20 μm-thick microporous polyethylene film serving as a separator and then wound. The wound laminate was sealed in an exterior material composed of an aluminum laminated film, thereby obtaining a nonaqueous electrolyte secondary battery of this Example.

A part of the specification of the obtained nonaqueous electrolyte secondary battery is shown in Table 1.

Examples 1-1-2 to 1-1-5 and Comparative Examples 1-1-1 and 1-1-2

The same operations as in Example 1-1-1 were repeated, except that in the preparation of a nonaqueous electrolyte composition, a part of the specification was changed as shown in Table 1, thereby obtaining nonaqueous electrolyte secondary batteries of the respective Examples and Comparative Examples.

TABLE 1

| | Surfactant | | Filler | | | | | | |
|---|---|---|---|---|---|---|---|---|---|
| | Kind (—) | Addition amount (parts by mass) | Concentration of impurities (ppm) | Kind (—) | Alpha-conversion rate (%) | Short-circuit load (N) | Cycle characteristic (500 cycles) (%) | OCV (V) | Dispersing time (min) |
| Example 1-1-1 | Hydrocarbon based | 0.2 | 55 | $Al_2O_3$ | 90 | 1050 | 86 | 4.115 | 30 |
| Example 1-1-2 | Hydrocarbon based | 0.3 | 55 | $Al_2O_3$ | 90 | 1070 | 86 | 4.119 | 10 |
| Example 1-1-3 | Hydrocarbon based | 1.0 | 55 | $Al_2O_3$ | 90 | 1080 | 86 | 4.117 | 10 |
| Example 1-1-4 | Hydrocarbon based | 5.0 | 55 | $Al_2O_3$ | 90 | 1090 | 84 | 4.113 | 10 |
| Example 1-1-5 | Hydrocarbon based | 6.0 | 55 | $Al_2O_3$ | 90 | 1085 | 80 | 4.111 | 10 |
| Comparative Example 1-1-1 | — | — | — | — | — | 750 | 86 | 4.12 | — |

TABLE 1-continued

| | Surfactant | | Filler | | | | | |
|---|---|---|---|---|---|---|---|---|
| | Kind (—) | Addition amount (parts by mass) | Concentration of impurities (ppm) | Kind (—) | Alpha-conversion rate (%) | Short-circuit load (N) | Cycle characteristic (500 cycles) (%) | OCV (V) | Dispersing time (min) |
| Comparative Example 1-1-2 | Hydrocarbon based | 1.0 | — | — | — | 750 | 86 | 4.11 | 10 |

Examples 1-2-1 to 1-2-5 and Comparative Examples 1-1-1 and 1-1-3

The same operations as in Example 1-1-1 were repeated, except that in the preparation of a nonaqueous electrolyte composition, a part of the specification was changed as shown in Table 2, thereby obtaining nonaqueous electrolyte secondary batteries of the respective Examples and Comparative Examples.

In the following Examples and Comparative Example, 3-methacrylopropyl triethoxysilane was used as the silicone based surfactant.

TABLE 2

| | Surfactant | | | Filler | | | | | |
|---|---|---|---|---|---|---|---|---|---|
| | Kind (—) | Addition amount (parts by mass) | Concentration of impurities (ppm) | Kind (—) | Alpha-conversion rate (%) | Short-circuit load (N) | Cycle characteristic (500 cycles) (%) | OCV (V) | Dispersing time (min) |
| Example 1-2-1 | Silicone based | 0.2 | 55 | $Al_2O_3$ | 90 | 1050 | 86 | 4.115 | 30 |
| Example 1-2-2 | Silicone based | 0.3 | 55 | $Al_2O_3$ | 90 | 1070 | 86 | 4.119 | 10 |
| Example 1-2-3 | Silicone based | 1.0 | 55 | $Al_2O_3$ | 90 | 1080 | 86 | 4.117 | 10 |
| Example 1-2-4 | Silicone based | 5.0 | 55 | $Al_2O_3$ | 90 | 1090 | 84 | 4.113 | 10 |
| Example 1-2-5 | Silicone based | 6.0 | 55 | $Al_2O_3$ | 90 | 1090 | 80 | 4.11 | 10 |
| Comparative Example 1-1-1 | — | — | — | — | — | 750 | 86 | 4.12 | — |
| Comparative Example 1-1-3 | Silicone based | 1.0 | — | — | — | 750 | 86 | 4.11 | 10 |

Examples 1-3-1 to 1-3-5 and Comparative Examples 1-1-1, 1-1-2 and 1-1-4 to 1-1-7

The same operations as in Example 1-1-1 were repeated, except that in the preparation of a nonaqueous electrolyte composition, a part of the specification was changed as shown in Table 3, thereby obtaining nonaqueous electrolyte secondary batteries of the respective Examples and Comparative Examples.

TABLE 3

| | Surfactant | | | Filler | | | | | |
|---|---|---|---|---|---|---|---|---|---|
| | Kind (—) | Addition amount (parts by mass) | Concentration of impurities (ppm) | Kind (—) | Alpha-conversion rate (%) | Short-circuit load (N) | Cycle characteristic (500 cycles) (%) | OCV (V) | Dispersing time (min) |
| Example 1-3-1 | Hydrocarbon based | 0.2 | 55 | $ZrO_2$ | — | 1040 | 84 | 4.116 | 30 |
| Example 1-3-2 | Hydrocarbon based | 0.3 | 55 | $ZrO_2$ | — | 1060 | 86 | 4.119 | 10 |
| Example 1-3-3 | Hydrocarbon based | 1.0 | 55 | $ZrO_2$ | — | 1070 | 86 | 4.117 | 10 |
| Example 1-3-4 | Hydrocarbon based | 5.0 | 55 | $ZrO_2$ | — | 1080 | 84 | 4.113 | 10 |
| Example 1-3-5 | Hydrocarbon based | 6.0 | 55 | $ZrO_2$ | — | 1080 | 80 | 4.11 | 10 |

TABLE 3-continued

|  | Surfactant | | Filler | | | | | | |
|---|---|---|---|---|---|---|---|---|---|
|  | Kind (—) | Addition amount (parts by mass) | Concentration of impurities (ppm) | Kind (—) | Alpha-conversion rate (%) | Short-circuit load (N) | Cycle characteristic (500 cycles) (%) | OCV (V) | Dispersing time (min) |
| Comparative Example 1-1-1 | — | — | — | — | — | 750 | 86 | 4.12 | — |
| Comparative Example 1-1-2 | Hydrocarbon based | 1.0 | — | — | — | 750 | 86 | 4.11 | 10 |
| Comparative Example 1-1-4 | — | — | 20 | ZrO$_2$ | — | 1040 | 86 | 4.12 | 30 |
| Comparative Example 1-1-5 | — | — | 55 | ZrO$_2$ | — | 1040 | 86 | 4.116 | 30 |
| Comparative Example 1-1-6 | — | — | 100 | ZrO$_2$ | — | 1040 | 86 | 4.11 | 30 |
| Comparative Example 1-1-7 | — | — | 150 | ZrO$_2$ | — | 1040 | 85 | 4.095 | 30 |

Examples 1-4-1 to 1-4-5 and Comparative Examples 1-1-1, 1-1-3 and 1-1-4 to 1-1-7

The same operations as in Example 1-1-1 were repeated, except that in the preparation of a nonaqueous electrolyte composition, a part of the specification was changed as shown in Table 4, thereby obtaining nonaqueous electrolyte secondary batteries of the respective Examples and Comparative Examples.

TABLE 4

|  | Surfactant | | Filler | | | | | | |
|---|---|---|---|---|---|---|---|---|---|
|  | Kind (—) | Addition amount (parts by mass) | Concentration of impurities (ppm) | Kind (—) | Alpha-conversion rate (%) | Short-circuit load (N) | Cycle characteristic (500 cycles) (%) | OCV (V) | Dispersing time (min) |
| Example 1-4-1 | Silicone based | 0.2 | 55 | ZrO$_2$ | — | 1030 | 86 | 4.115 | 30 |
| Example 1-4-2 | Silicone based | 0.3 | 55 | ZrO$_2$ | — | 1050 | 86 | 4.119 | 10 |
| Example 1-4-3 | Silicone based | 1.0 | 55 | ZrO$_2$ | — | 1070 | 85 | 4.117 | 10 |
| Example 1-4-4 | Silicone based | 5.0 | 55 | ZrO$_2$ | — | 1080 | 84 | 4.113 | 10 |
| Example 1-4-5 | Silicone based | 6.0 | 55 | ZrO$_2$ | — | 1080 | 80 | 4.109 | 30 |
| Comparative Example 1-1-1 | — | — | — | — | — | 750 | 86 | 4.12 | — |
| Comparative Example 1-1-3 | Silicone based | 1.0 | — | — | — | 750 | 86 | 4.11 | 10 |
| Comparative Example 1-1-4 | — | — | 20 | ZrO$_2$ | — | 1040 | 86 | 4.12 | 30 |
| Comparative Example 1-1-5 | — | — | 55 | ZrO$_2$ | — | 1040 | 86 | 4.116 | 30 |
| Comparative Example 1-1-6 | — | — | 100 | ZrO$_2$ | — | 1040 | 86 | 4.11 | 30 |
| Comparative Example 1-1-7 | — | — | 150 | ZrO$_2$ | — | 1040 | 85 | 4.095 | 30 |

Examples 1-5-1 to 1-5-3 and Comparative Examples 1-1-1, 1-1-2 and 1-1-8 to 1-1-10

The same operations as in Example 1-1-1 were repeated, except that in the preparation of a nonaqueous electrolyte composition, a part of the specification was changed as shown in Table 5, thereby obtaining nonaqueous electrolyte secondary batteries of the respective Examples and Comparative Examples.

TABLE 5

| | Surfactant | | Filler | | | | | | |
|---|---|---|---|---|---|---|---|---|---|
| | Kind (—) | Addition amount (parts by mass) | Concentration of impurities (ppm) | Kind (—) | Alpha-conversion rate (%) | Short-circuit load (N) | Cycle characteristic (500 cycles) (%) | OCV (V) | Dispersing time (min) |
| Example 1-5-1 | Hydrocarbon based | 0.3 | 55 | $TiO_2$ | — | 1060 | 86 | 4.119 | 10 |
| Example 1-5-2 | Hydrocarbon based | 1.0 | 55 | $TiO_2$ | — | 1070 | 85 | 4.117 | 10 |
| Example 1-5-3 | Hydrocarbon based | 5.0 | 55 | $TiO_2$ | — | 1080 | 83 | 4.113 | 10 |
| Comparative Example 1-1-1 | — | — | — | — | — | 750 | 86 | 4.12 | — |
| Comparative Example 1-1-2 | Hydrocarbon based | 1.0 | — | — | — | 750 | 86 | 4.11 | 10 |
| Comparative Example 1-1-8 | — | — | 20 | $TiO_2$ | — | 1050 | 86 | 4.12 | 30 |
| Comparative Example 1-1-9 | — | — | 55 | $TiO_2$ | — | 1050 | 86 | 4.116 | 30 |
| Comparative Example 1-1-10 | — | — | 100 | $TiO_2$ | — | 1050 | 86 | 4.11 | 30 |

Examples 1-6-1 to 1-6-3 and Comparative Examples 1-1-1, 1-1-3 and 1-1-8 to 1-1-10

The same operations as in Example 1-1-1 were repeated, except that in the preparation of a nonaqueous electrolyte composition, a part of the specification was changed as shown in Table 6, thereby obtaining nonaqueous electrolyte secondary batteries of the respective Examples and Comparative Examples.

TABLE 6

| | Surfactant | | Filler | | | | | | |
|---|---|---|---|---|---|---|---|---|---|
| | Kind (—) | Addition amount (parts by mass) | Concentration of impurities (ppm) | Kind (—) | Alpha-conversion rate (%) | Short-circuit load (N) | Cycle characteristic (500 cycles) (%) | OCV (V) | Dispersing time (min) |
| Example 1-6-1 | Silicone based | 0.3 | 55 | $TiO_2$ | — | 1050 | 85 | 4.119 | 10 |
| Example 1-6-2 | Silicone based | 1.0 | 55 | $TiO_2$ | — | 1070 | 85 | 4.117 | 10 |
| Example 1-6-3 | Silicone based | 5.0 | 55 | $TiO_2$ | — | 1080 | 84 | 4.113 | 10 |
| Comparative Example 1-1-1 | — | — | — | — | — | 750 | 86 | 4.12 | — |
| Comparative Example 1-1-3 | Silicone based | 1.0 | — | — | — | 750 | 86 | 4.11 | 10 |
| Comparative Example 1-1-8 | — | — | 20 | $TiO_2$ | — | 1050 | 86 | 4.12 | 30 |
| Comparative Example 1-1-9 | — | — | 55 | $TiO_2$ | — | 1050 | 86 | 4.116 | 30 |
| Comparative Example 1-1-10 | — | — | 100 | $TiO_2$ | — | 1050 | 86 | 4.11 | 30 |

Examples 1-7-1 to 1-7-3 and Comparative Examples 1-1-1, 1-1-2 and 1-1-11 to 1-1-13

The same operations as in Example 1-1-1 were repeated, except that in the preparation of a nonaqueous electrolyte composition, a part of the specification was changed as shown in Table 7, thereby obtaining nonaqueous electrolyte secondary batteries of the respective Examples and Comparative Examples.

TABLE 7

|  | Surfactant | | Filler | | | | | | |
| --- | --- | --- | --- | --- | --- | --- | --- | --- | --- |
|  | Kind (—) | Addition amount (parts by mass) | Concentration of impurities (ppm) | Kind (—) | Alpha-conversion rate (%) | Short-circuit load (N) | Cycle characteristic (500 cycles) (%) | OCV (V) | Dispersing time (min) |
| Example 1-7-1 | Hydrocarbon based | 0.3 | 55 | MgO | — | 1060 | 86 | 4.119 | 10 |
| Example 1-7-2 | Hydrocarbon based | 1.0 | 55 | MgO | — | 1070 | 86 | 4.117 | 10 |
| Example 1-7-3 | Hydrocarbon based | 5.0 | 55 | MgO | — | 1080 | 84 | 4.113 | 10 |
| Comparative Example 1-1-1 | — | — | — | — | — | 750 | 86 | 4.12 | — |
| Comparative Example 1-1-2 | Hydrocarbon based | 1.0 | — | — | — | 750 | 86 | 4.11 | 10 |
| Comparative Example 1-1-11 | — | — | 20 | MgO | — | 1040 | 86 | 4.12 | 30 |
| Comparative Example 1-1-12 | — | — | 55 | MgO | — | 1040 | 86 | 4.116 | 30 |
| Comparative Example 1-1-13 | — | — | 100 | MgO | — | 1040 | 86 | 4.11 | 30 |

Examples 1-8-1 to 1-8-3 and Comparative Examples 1-1-1, 1-1-3 and 1-1-11 to 1-1-13

The same operations as in Example 1-1-1 were repeated, except that in the preparation of a nonaqueous electrolyte composition, a part of the specification was changed as shown in Table 8, thereby obtaining nonaqueous electrolyte secondary batteries of the respective Examples and Comparative Examples.

TABLE 8

|  | Surfactant | | Filler | | | | | | |
| --- | --- | --- | --- | --- | --- | --- | --- | --- | --- |
|  | Kind (—) | Addition amount (parts by mass) | Concentration of impurities (ppm) | Kind (—) | Alpha-conversion rate (%) | Short-circuit load (N) | Cycle characteristic (500 cycles) (%) | OCV (V) | Dispersing time (min) |
| Example 1-8-1 | Silicone based | 0.3 | 55 | MgO | — | 1050 | 86 | 4.119 | 10 |
| Example 1-8-2 | Silicone based | 1.0 | 55 | MgO | — | 1070 | 86 | 4.117 | 10 |
| Example 1-8-3 | Silicone based | 5.0 | 55 | MgO | — | 1080 | 84 | 4.113 | 10 |
| Comparative Example 1-1-1 | — | — | — | — | — | 750 | 86 | 4.12 | — |
| Comparative Example 1-1-3 | Silicone based | 1.0 | — | — | — | 750 | 86 | 4.11 | 10 |
| Comparative Example 1-1-11 | — | — | 20 | MgO | — | 1040 | 86 | 4.12 | 30 |
| Comparative Example 1-1-12 | — | — | 55 | MgO | — | 1040 | 86 | 4.116 | 30 |
| Comparative Example 1-1-13 | — | — | 100 | MgO | — | 1040 | 86 | 4.11 | 30 |

Example 2-1-1

Preparation of Positive Electrode

First of all, 91 parts by mass of a lithium cobalt complex oxide ($LiCoO_2$) as a positive electrode active material, 6 parts by mass of graphite as a conductive agent and 10 parts by mass of polyvinylidene fluoride (PVdF) as a binder were uniformly mixed, and the mixture was dispersed in N-methyl-2-pyrrolidone (NMP) to obtain a positive electrode mixture slurry.

Subsequently, the obtained positive electrode mixture slurry was uniformly coated on the both surfaces of a 20 μm-thick strip-shaped aluminum foil serving as a positive electrode collector and dried to form a positive electrode active material layer. This was cut into a shape having a size of 38 mm in width and 700 mm in length, thereby preparing a positive electrode. A positive electrode terminal was further installed in the positive electrode.

(Preparation of Negative Electrode)

Next, 90 parts by mass of artificial graphite as a negative electrode active material and 10 parts by mass of PVdF as a binder were uniformly mixed, and the mixture was dispersed in NMP to obtain a negative electrode mixture slurry.

Subsequently, the obtained negative electrode mixture slurry was uniformly coated on the both surfaces of a 10 μm-thick strip-shaped copper foil serving as a negative electrode collector and dried to form a negative electrode mixture layer. This was cut into a shape having a size of 40 mm in width and 650 mm in length, thereby preparing a negative electrode. A negative electrode terminal was further installed in the negative electrode.

(Preparation of Nonaqueous Electrolyte Composition)

Also, a composition prepared by mixing 90 parts by mass of a nonaqueous electrolytic solution, 10 parts by mass of a polyvinylidene fluoride-hexafluoropropylene copolymer (PVdF/HFP=93.1/6.9 (mass ratio)) as a matrix resin and 10 parts by mass of an aluminum oxide (concentration of impurities: 20 ppm, alpha-conversion rate: 90%) as a filler and dispersing the mixture was used as a nonaqueous electrolyte composition.

A solution prepared by dissolving lithium hexafluorophosphate ($LiPF_6$) as an electrolyte salt in a concentration of 0.8 moles/kg in a nonaqueous solvent prepared by mixing ethylene carbonate and propylene carbonate in a proportion of ethylene carbonate to propylene carbonate of 6/4 (mass ratio) was used as the nonaqueous electrolytic solution.

Also, at that time, a dispersing time was 30 minutes.
(Preparation of Nonaqueous Electrolyte Secondary Battery)

The obtained positive electrode and negative electrode were each coated with the obtained nonaqueous electrolyte composition, laminated via a 20 μm-thick microporous polyethylene film serving as a separator and then wound. The wound laminate was sealed in an exterior material composed of an aluminum laminated film, thereby obtaining a nonaqueous electrolyte secondary battery of this Example.

A part of the specification of the obtained nonaqueous electrolyte secondary battery is shown in Table 9.

Examples 2-1-2 to 2-1-6 and Comparative Example 2-1-1

The same operations as in Example 2-1-1 were repeated, except that in the preparation of a nonaqueous electrolyte composition, a part of the specification was changed as shown in Table 9, thereby obtaining nonaqueous electrolyte secondary batteries of the respective Examples and Comparative Example.

TABLE 9

| | Surfactant | | Filler | | | | | |
|---|---|---|---|---|---|---|---|---|
| | Kind (—) | Addition amount (parts by mass) | Concentration of impurities (ppm) | Kind (—) | Alpha-conversion rate (%) | Short-circuit load (N) | Cycle characteristic (500 cycles) (%) | OCV (V) | Dispersing time (min) |
| Example 2-1-1 | — | — | 20 | $Al_2O_3$ | 90 | 1050 | 86 | 4.12 | 30 |
| Example 2-1-2 | — | — | 55 | $Al_2O_3$ | 90 | 1050 | 86 | 4.116 | 30 |
| Example 2-1-3 | — | — | 100 | $Al_2O_3$ | 90 | 1050 | 86 | 4.11 | 30 |
| Example 2-1-4 | — | — | 150 | $Al_2O_3$ | 90 | 1050 | 85 | 4.095 | 30 |
| Example 2-1-5 | — | — | 55 | $Al_2O_3$ | 80 | 1040 | 84 | 4.11 | 30 |
| Example 2-1-6 | — | — | 55 | $Al_2O_3$ | 100 | 1050 | 87 | 4.116 | 30 |
| Comparative Example 2-1-1 | — | — | 55 | $Al_2O_3$ | 75 | 1050 | 80 | 4.108 | 30 |

[Evaluation of Performances]

The thus obtained respective batteries of the respective Examples and Comparative Examples were evaluated with respect to the following performances, and the obtained results are also shown in Tables 1 to 9.
(Short-Circuit Load)

A cell center was pressurized at a rate of 3 mm/min by a SUS-made rod having a diameter of 10 mm, a tip angle of 45° and R=4 mm, and a load impressed to the cell until a short circuit was generated was measured. A value of 1,000 N or more is considered to be favorable.
(Cycle Characteristic)

An operation of charging the battery at 4.2 V and 1 C for 3 hours and then discharging it to 3.0 V at 1 C was defined as one cycle, and this operation was repeated. It is desirable that a retention rate after 500 cycles shows 80% or more.
(Open-Circuit Voltage (OCV))

The battery was charged at 4.2 V and 1 C for 3 hours and then allowed to stand in an atmosphere at 80° C. for 4 days. After allowing the battery to stand, its open-circuit voltage was measured. It is desirable that the open-circuit voltage after 4 days shows 4.1 V or more.

It is noted from Table 1 that Examples 1-1-1 to 1-1-5 falling within the claimed scope enhance the short-circuit load without remarkably lowering the battery characteristics such as the cycle characteristic and OCV as compared with Comparative Examples 1-1-1 and 1-1-2 falling outside the claimed scope. In particular, it is noted that Examples 1-1-2 to 1-1-4 more enhance the short-circuit load without substantially lowering the battery characteristics such as the cycle characteristic and OCV.

It is noted from Table 2 that Examples 1-2-1 to 1-2-5 falling within the claimed scope enhance the short-circuit load without remarkably lowering the battery characteristics such as the cycle characteristic and OCV as compared with Comparative Examples 1-1-1 and 1-1-3 falling outside the claimed scope. In particular, it is noted that Examples 1-2-2 to 1-2-4 more enhance the short-circuit load without substantially lowering the battery characteristics such as the cycle characteristic and OCV.

It is noted from Table 3 that Examples 1-3-1 to 1-3-5 falling within the claimed scope enhance the short-circuit load without remarkably lowering the battery characteristics such as the cycle characteristic and OCV as compared with Comparative Examples 1-1-1 and 1-1-2 falling outside the claimed scope. In particular, it is noted that Examples 1-3-2 to 1-3-4 more enhance the short-circuit load without substantially lowering the battery characteristics such as the cycle characteristic and OCV as compared with Comparative Examples 1-1-1, 1-1-2 and 1-1-4 to 1-1-7.

It is noted from Table 4 that Examples 1-4-1 to 1-4-5 falling within the claimed scope enhance the short-circuit load without remarkably lowering the battery characteristics such as the cycle characteristic and OCV as compared with Comparative Examples 1-1-1 and 1-1-3 falling outside the claimed scope. In particular, it is noted that Examples 1-4-2 to 1-4-4 more enhance the short-circuit load without substantially lowering the battery characteristics such as the cycle characteristic and OCV as compared with Comparative Examples 1-1-1, 1-1-3 and 1-1-4 to 1-1-7.

It is noted from Table 5 that Examples 1-5-1 to 1-5-3 falling within the claimed scope enhance the short-circuit load without remarkably lowering the battery characteristics such as the cycle characteristic and OCV as compared with Comparative Examples 1-1-1 and 1-1-2 falling outside the claimed scope. In particular, it is noted that Examples 1-5-1 to 1-5-3 more enhance the short-circuit load without substantially lowering the battery characteristics such as the cycle characteristic and OCV as compared with Comparative Examples 1-1-1, 1-1-2 and 1-1-8 to 1-1-10.

It is noted from Table 6 that Examples 1-6-1 to 1-6-3 falling within the claimed scope enhance the short-circuit load without remarkably lowering the battery characteristics such as the cycle characteristic and OCV as compared with Comparative Examples 1-1-1 and 1-1-3 falling outside the claimed scope. In particular, it is noted that Examples 1-6-1 to 1-6-3 more enhance the short-circuit load without substantially lowering the battery characteristics such as the cycle characteristic and OCV as compared with Comparative Examples 1-1-1, 1-1-3 and 1-1-8 to 1-1-10.

It is noted from Table 7 that Examples 1-7-1 to 1-7-3 falling within the claimed scope enhance the short-circuit load without remarkably lowering the battery characteristics such as the cycle characteristic and OCV as compared with Comparative Examples 1-1-1 and 1-1-2 falling outside the claimed scope. In particular, it is noted that Examples 1-7-1 to 1-7-3 more enhance the short-circuit load without substantially lowering the battery characteristics such as the cycle characteristic and OCV as compared with Comparative Examples 1-1-1, 1-1-2 and 1-1-11 to 1-1-13.

It is noted from Table 8 that Examples 1-8-1 to 1-8-3 falling within the claimed scope enhance the short-circuit load without remarkably lowering the battery characteristics such as the cycle characteristic and OCV as compared with Comparative Examples 1-1-1 and 1-1-3 falling outside the claimed scope. In particular, it is noted that Examples 1-8-1 to 1-8-3 more enhance the short-circuit load without substantially lowering the battery characteristics such as the cycle characteristic and OCV as compared with Comparative Examples 1-1-1, 1-1-3 and 1-1-11 to 1-1-13.

It is noted from Table 9 that Examples 2-1-1 to 2-1-6 falling within the claimed scope enhance the short-circuit load without remarkably lowering the battery characteristics such as the cycle characteristic and OCV as compared with Comparative Example 2-1-1 falling outside the claimed scope.

Also, it is noted from Table 9 that the alpha-conversion rate is more preferably 90% or more. Furthermore, it is noted from Table 9 that the concentration of impurities is more preferably not more than 100 ppm.

While the present invention has been described with reference to the embodiments and working examples, it should not be construed that the present invention is limited to the foregoing embodiments and working examples, but various modifications can be made within the gist of the present invention.

For example, in the foregoing embodiments, while the case where the battery element 20 having the positive electrode 21 and the negative electrode 22 laminated and wound therein is provided has been described, the present invention is also applicable to the case where a plate-shaped battery element having a pair of a positive electrode and a negative electrode laminated therein or a battery element of a laminate type in which a plurality of positive electrodes and negative electrodes are laminated is provided.

Furthermore, as described previously, though the present invention is concerned with a battery using lithium as an electrode reactant, the technical thought of the present invention is also applicable to the case of using other alkali metal such as sodium (Na) and potassium (K), an alkaline earth metal such as magnesium (Mg) and calcium (Ca), or other light metal such as aluminum.

The present application contains subject matter related to that disclosed in Japanese Priority Patent Application JP 2009-108064 filed in the Japan Patent Office on Apr. 27, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A nonaqueous electrolyte composition comprising:
   a nonaqueous solvent;
   an electrolyte salt;
   a matrix resin;
   a filler; and
   a surfactant that disperses the filler within the nonaqueous electrolyte composition,
   wherein the filler comprises at least an aluminum oxide, the aluminum oxide is an aluminum oxide having an alpha-conversion rate of 80%, and the surfactant comprises a silicone based surfactant.

2. The nonaqueous electrolyte composition according to claim 1, wherein the silicone based surfactant is nonionic.

* * * * *